(12) United States Patent
Gu et al.

(10) Patent No.: US 12,639,164 B2
(45) Date of Patent: May 26, 2026

(54) DATA ERROR CORRECTION METHOD AND APPARATUS

(71) Applicant: HUAWEI TECHNOLOGIES CO., LTD., Shenzhen (CN)

(72) Inventors: Xinli Gu, Shenzhen (CN); Kun Tang, Chengdu (CN); Tianwen Yang, Shenzhen (CN); Guoliang Zhu, Shenzhen (CN); Buchan Li, Chengdu (CN); Xu Zhang, Hangzhou (CN)

(73) Assignee: Huawei Technologies Co., LTD.

( * ) Notice: Subject to any disclaimer, the term of this patent is extended or adjusted under 35 U.S.C. 154(b) by 0 days.

(21) Appl. No.: 18/830,196

(22) Filed: Sep. 10, 2024

(65) Prior Publication Data

US 2025/0004876 A1     Jan. 2, 2025

Related U.S. Application Data

(63) Continuation of application No. PCT/CN2023/082916, filed on Mar. 21, 2023.

(30) Foreign Application Priority Data

Mar. 21, 2022     (CN) .......................... 202210279415.1

(51) Int. Cl.
*G06F 11/10*          (2006.01)

(52) U.S. Cl.
CPC ................................. *G06F 11/1044* (2013.01)

(58) Field of Classification Search
CPC .................................................. G06F 11/1044
See application file for complete search history.

(56) References Cited

U.S. PATENT DOCUMENTS

| | | | |
|---|---|---|---|
| 2003/0061558 A1* | 3/2003 | Fackenthal | ........... H03M 13/29 |
| 2012/0084623 A1* | 4/2012 | Hasegawa | ........ H03M 13/2909 |
| | | | 714/755 |

(Continued)

FOREIGN PATENT DOCUMENTS

CN          105740088 A      7/2016

OTHER PUBLICATIONS

International Search Report and Written Opinion in International Appln. No. PCT/CN2023/082916, mailed on Jun. 25, 2023, 13 pages (with English translation).

(Continued)

*Primary Examiner* — Bryce P Bonzo
*Assistant Examiner* — Xinyuan Yu
(74) *Attorney, Agent, or Firm* — Fish & Richardson P.C.

(57)     ABSTRACT

The present disclosure relates to data error correction methods and apparatuses. One example method is applied to to-be-corrected data in a storage medium. Column check information is set for the to-be-corrected data, and the column check information includes check data of each column of data in the to-be-corrected data. The example method includes determining that first-row data in to-be-corrected data includes an uncorrected error, and performing error correction on each column of data in the to-be-corrected data based on column check information of the to-be-corrected data, where each column of data includes one bit of data in the first-row data. For each bit of data in the first-row data, if the bit of data is incorrect, after error correction is performed on a column in which the bit of data is located, the bit of data is corrected.

15 Claims, 6 Drawing Sheets

(56)        References Cited

U.S. PATENT DOCUMENTS

2019/0317857 A1 *   10/2019   Khan  ................. G06F 11/1012
2020/0313694 A1 *   10/2020   Wu  ................... H03M 13/1105

OTHER PUBLICATIONS

Extended European Search Report in European Appln. No. 23773878. 6, mailed on Apr. 28, 2025, 8 pages.

* cited by examiner

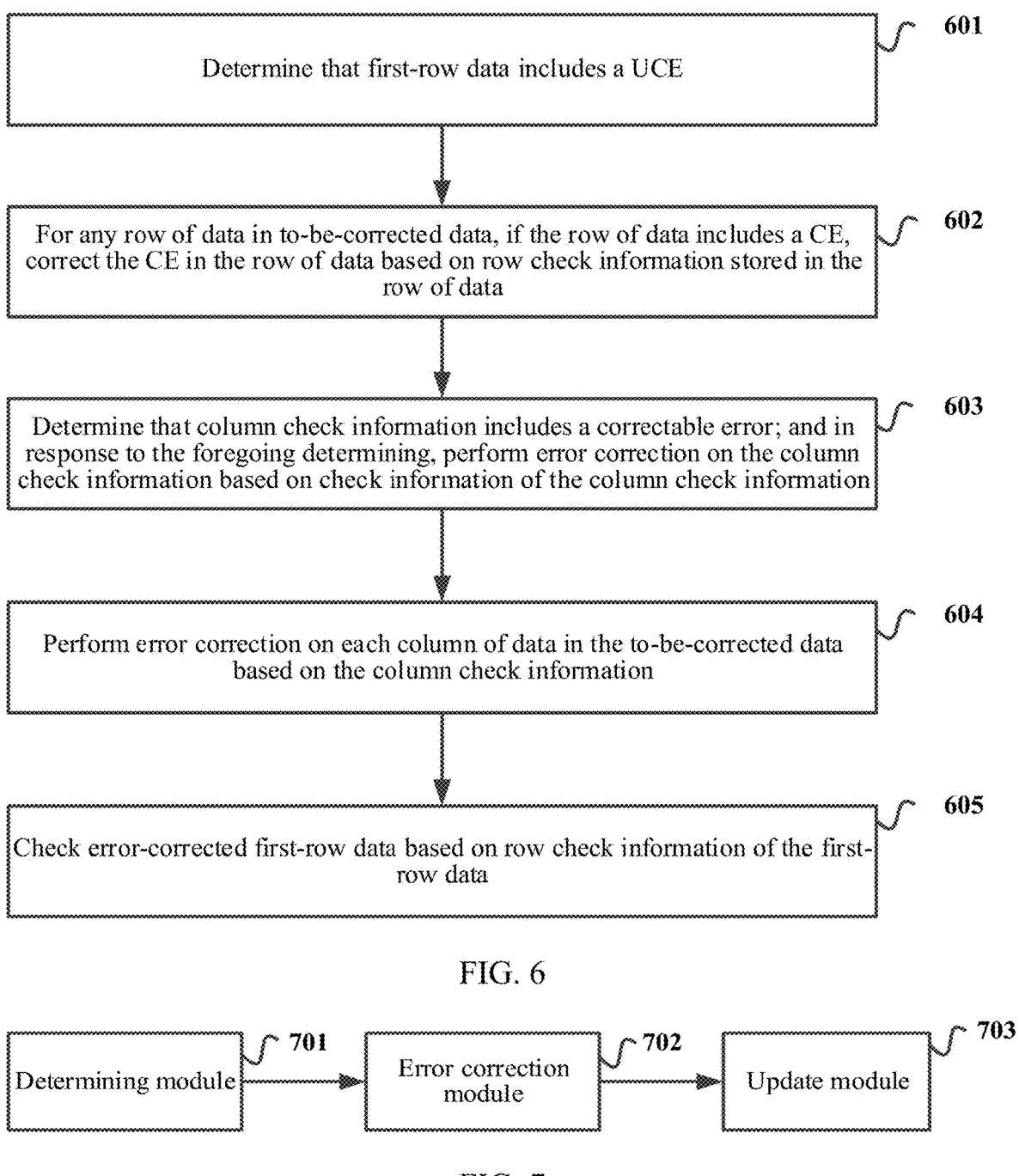

Determine that first-row data includes a UCE                    601

For any row of data in to-be-corrected data, if the row of data includes a CE, correct the CE in the row of data based on row check information stored in the row of data                    602

Determine that column check information includes a correctable error; and in response to the foregoing determining, perform error correction on the column check information based on check information of the column check information                    603

Perform error correction on each column of data in the to-be-corrected data based on the column check information                    604

Check error-corrected first-row data based on row check information of the first-row data                    605

FIG. 6

Determining module    701          Error correction module    702          Update module    703

FIG. 7

DATA ERROR CORRECTION METHOD AND APPARATUS

CROSS-REFERENCE TO RELATED APPLICATIONS

This application is a continuation of International Application No. PCT/CN2023/082916, filed on Mar. 21, 2023, which claims priority to Chinese Patent Application No. 202210279415.1, filed on Mar. 21, 2022. The disclosures of the aforementioned applications are hereby incorporated by reference in their entireties.

TECHNICAL FIELD

This application relates to the field of data storage technologies, and in particular, to a data error correction method and apparatus.

BACKGROUND

Storage media may be measured in terms of reliability, availability, and serviceability (RAS). With development of storage medium technologies, storage media become more compact, and data storage density is increasing. For example, data storage density of memories is increasing. However, data errors may occur in the storage medium. Therefore, as data storage density increases, an RAS requirement for the storage medium becomes higher.

In the conventional technologies, to ensure RAS of storage media, an error correction code (ECC) of data may be stored in the storage medium, to perform error correction on the data. Data errors in storage media may be classified into two types: a corrected error (CE) and an uncorrected error (UCE). Specifically, the corrected error can be corrected based on the ECC using an existing error correction algorithm. The CE usually occurs in a storage unit of a storage medium, and a size of data on which the error occurs is usually one bit. For example, a memory die is a storage unit in a memory, and the CE in the memory usually occurs in a memory cell. The uncorrected error is an error that cannot be corrected based on the ECC using an existing error correction algorithm. This type of error usually crosses a plurality of storage units of a storage medium, and a size of data on which the error occurs is a plurality of bits. Therefore, to improve RAS of a storage medium, an error correction solution for correcting a UCE in a storage medium is urgently needed.

SUMMARY

This application provides a data error correction method and apparatus, to correct a UCE of to-be-corrected data in a storage medium.

According to a first aspect, this application provides a data error correction method, applied to to-be-corrected data in a storage medium. For example, the storage medium may be a memory, a hard disk drive, or the like. The method may be performed by a data error correction apparatus provided in embodiments of this application, and the data error correction apparatus may be an electronic device provided in this application. The method includes:

determining that first-row data in to-be-corrected data includes an uncorrected error; and performing error correction on each column of data in the to-be-corrected data based on column check information of the to-be-corrected data, where the column check information includes check data of each column of data in the to-be-corrected data, and each column of data includes one bit of data in the first-row data.

This application provides a data error correction method. It is determined that the first-row data of first data includes the uncorrected error. The column check information of the first data includes the check data of each column of data in the first data, and each column of data includes one bit of data in the first-row data. Error correction is performed on each column of data in the first data based on the column check information of the first data. For each bit of data in the first-row data, if the bit of data is incorrect, after error correction is performed on a column in which the bit of data is located, the bit of data is corrected. Therefore, even if the first-row data includes an uncorrected error across a plurality of storage units, error correction can still be performed bit by bit on the first-row data. In this way, UCE correction is implemented.

There may be a plurality of data structures of the to-be-corrected data. In a possible implementation, the to-be-corrected data includes a plurality of rows of data, and the rows of data may have a same quantity of bits or may have different quantities of bits. In this case, the data error correction method provided in this application may be performed when the first-row data is the only row of data that includes the uncorrected error in the plurality of rows of data.

In the foregoing manner, rows of data other than the first-row data in the plurality of rows of data are more reliable. Therefore, data error correction reliability is improved when error correction is performed on each column of data in the to-be-corrected data based on the column check information.

There may also be a plurality of cases in which check information is set for the to-be-corrected data. In a possible case, row check information may be further set for each row of data in the to-be-corrected data, so that each row of data may be checked using the row check information.

Optionally, before error correction is performed on the first-row data, error correction may be further performed, based on row check information, on a row of data in which a corrected error occurs. Specific descriptions are as follows.

For any row of data in the to-be-corrected data, the row of data is checked based on row check information of the row of data. If it is determined that the row of data includes a corrected error, the corrected error is corrected in the row of data.

Optionally, after error correction is performed on the first-row data, whether error correction succeeds may be further checked. Specific descriptions are as follows.

The error-corrected first-row data is checked based on row check information of the first-row data.

In a possible implementation, corresponding check information may also be set for the column check information. When it is determined that the column check information includes a corrected error, in response to the foregoing determining, error correction is performed on the column check information based on the check information of the column check information.

In the foregoing manner, even if the corrected error occurs in the column check information, error correction may be performed on the column check information based on the check information of the column check information. This improves reliability of the column check information.

It is clear that the to-be-corrected data in the storage medium may be updated, and correspondingly, the column check information also needs to be updated.

In a possible implementation, the to-be-corrected data in a storage medium is updated; and the column check information is updated based on the updated to-be-corrected data.

In the foregoing manner, the column check information can be updated in time with update of the to-be-corrected data. This ensures reliability of the column check information.

According to a second aspect, this application provides a data error correction apparatus. The apparatus includes:

a determining module, configured to determine that first-row data in to-be-corrected data includes an uncorrected error; and an error correction module, configured to perform error correction on each column of data in the to-be-corrected data based on column check information of the to-be-corrected data, where the column check information includes check data of each column of data in the to-be-corrected data, and each column of data includes one bit of data in the first-row data.

Optionally, the error correction module is further configured to:

check error-corrected first-row data based on row check information of the first-row data.

Optionally, the to-be-corrected data includes a plurality of rows of data, and the first-row data is the only row of data that includes the uncorrected error in the plurality of rows of data.

Optionally, the column check information has corresponding check information, and the error correction module is further configured to:

determine that the column check information includes a corrected error; and in response to the foregoing determining, perform error correction on the column check information based on the check information of the column check information.

Optionally, the apparatus further includes an update module, configured to:

update the to-be-corrected data in a storage medium; and update the column check information based on updated to-be-corrected data.

According to a third aspect, this application provides an electronic device. The electronic device includes one or more processors and one or more memories. The one or more memories store one or more computer instructions. When the one or more computer instructions are executed by the one or more processors, the electronic device is enabled to perform the method according to any implementation of the first aspect.

According to a fourth aspect, this application provides a computer-readable storage medium, where the computer-readable storage medium includes computer instructions. When the computer instructions are run on a computer, the computer is enabled to perform the method according to any implementation of the first aspect.

For advantageous effects of the second aspect to the fourth aspect, refer to the advantageous effects of the first aspect. Details are not described again.

BRIEF DESCRIPTION OF DRAWINGS

FIG. 6 is a schematic flowchart of a data error correction method according to an embodiment of this application;

FIG. 7 is a schematic diagram of a structure of a data error correction apparatus according to an embodiment of this application.

DESCRIPTION OF EMBODIMENTS

Figure 1:
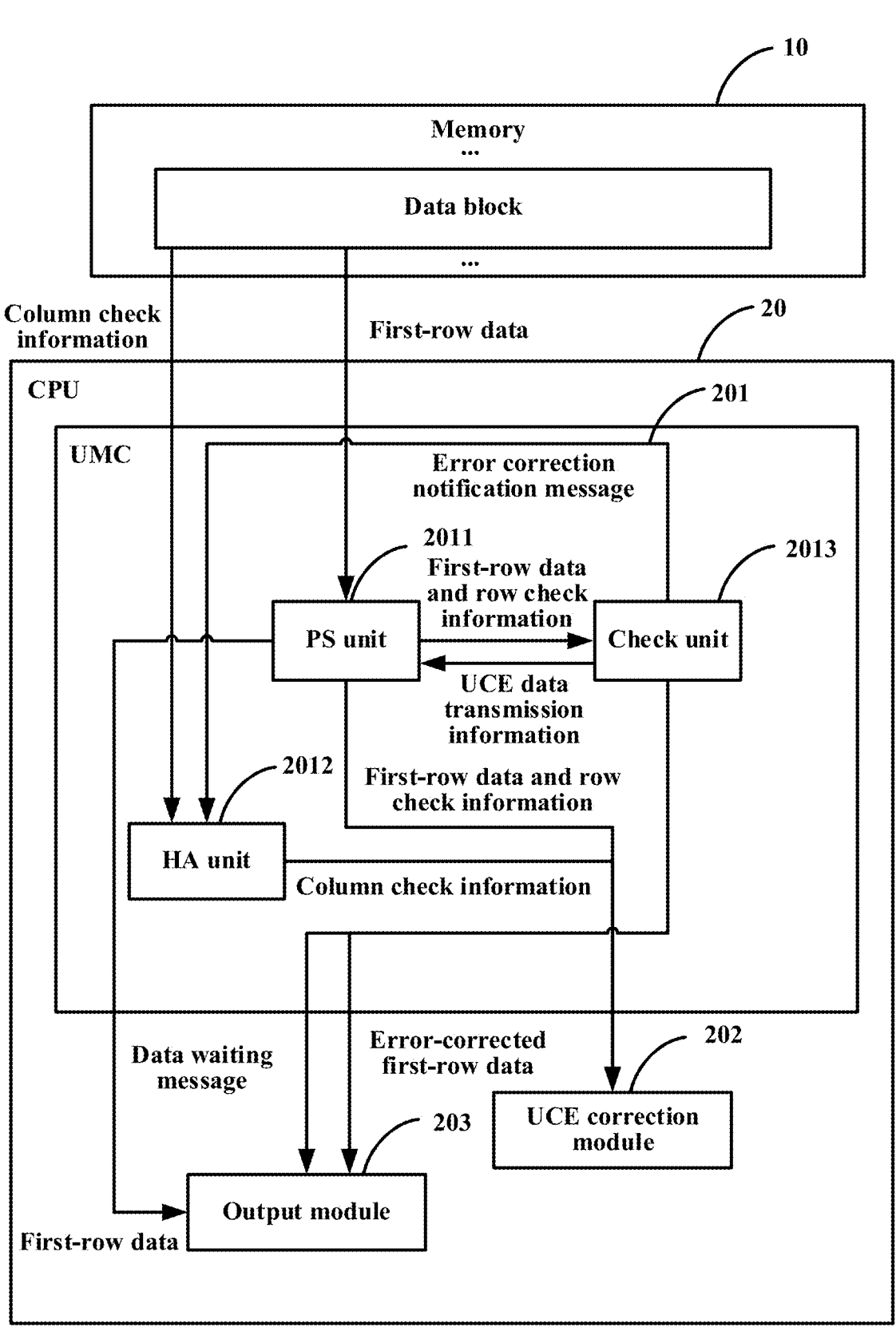
FIG. 1 is a schematic diagram of an architecture to which a data error correction method may be applied according to an embodiment of this application.

The following clearly describes technical solutions in embodiments of this application with reference to accompanying drawings in embodiments of this application.

Terms used in the following embodiments are merely intended to describe specific embodiments, but are not intended to limit this application. The terms "one", "a", "this", and "this one" of singular forms used in this specification and the appended claims of this application are also intended to include expressions such as "one or more", unless otherwise specified in the context clearly. It should be further understood that, in embodiments of this application, "one or more" means one or more than two (including two); and "and/or" describes an association relationship between associated objects, and represents that three relationships may exist. For example, "A and/or B" may represent the following case: Only A exists, both A and B exist, and only B exists, where A and B may be singular or plural. The character "/" usually indicates an "or" relationship between associated objects.

Reference to "an embodiment", "some embodiments", or the like described in this specification indicates that one or more embodiments of this application include a specific feature, structure, or characteristic described with reference to the embodiment. Therefore, statements such as "in an embodiment", "in some embodiments", "in some other embodiments", and "in other embodiments" that appear at different places in this specification do not necessarily mean reference to a same embodiment. Instead, the statements mean "one or more but not all of embodiments", unless otherwise specifically emphasized in another manner. The terms "include", "comprise", "have", and their variants all mean "include but are not limited to", unless otherwise specifically emphasized in another manner.

The term "a plurality of" in embodiments of this application means two or more. In view of this, "a plurality of" may also be understood as "at least two" in embodiments of this application. "At least one" may be understood as one or more, for example, one, two, or more. For example, "including at least one" means including one, two, or more, and does not limit items that are included. For example, if at least one of A, B, and C is included, A, B, C, A and B, A and C, B and C, or A, B, and C may be included. Understanding of descriptions such as "at least one type" is similar. The term "and/or" describes an association relationship between associated objects, and represents that three relationships may exist. For example, A and/or B may represent the following three cases: Only A exists, both A and B exist, and only B exists. In addition, the character "/" usually indicates an "or" relationship between associated objects.

Unless otherwise specified, ordinal numbers such as "first" and "second" in embodiments of this application are used to distinguish between a plurality of objects, and are not intended to limit a sequence, timing, priorities, or significance of the plurality of objects.

For ease of understanding, terms in embodiments of this application are explained and described, and explanations and descriptions of the terms are also used as a part of disclosure content of embodiments of this application.

A storage medium may store to-be-corrected data and check information of the to-be-corrected data, and correct the to-be-corrected data using the check information of the to-be-corrected data. Conventional error correction algorithms can be used to perform error correction on a CE of to-be-corrected data, but cannot perform error correction on a UCE of to-be-corrected data. Therefore, this application provides a data error correction method. For example, a storage medium is a memory. FIG. 1 is a schematic diagram of an architecture to which a data error correction method may be applied according to this application.

The architecture shown in FIG. 1 includes a memory 10 and a central processing unit (CPU) 20. A unified memory controller (UMC) 201, a UCE correction module 202, and an output module 203 are disposed on the CPU 20. The UMC 201 includes a patrol scanning (PS) unit 2011, a home agent (HA) unit 2012, and a check unit 2013. The UMC 201, the UCE correction module 202, and the output module 203 shown in FIG. 1 may be implemented in hardware, software, or a combination of hardware and software including one or more signal processing and/or application-specific integrated circuits, for example, may be implemented in a computer device.

When the foregoing components are implemented by hardware, the memory 10 may be connected to the check unit 2013; the check unit 2013 may further be connected to the PS unit 2011, the HA unit 2012, and the output module 203; the HA unit 2012 is connected to the PS unit 2011 and the output module 203; and the UCE correction module 202 may be connected to the PS unit 2011, the HA unit 2012, and the output module 203.

Specific forms of the foregoing components are not limited in embodiments of this application. For example, the memory 10 may include a volatile memory, for example, a random access memory (RAM) or a dynamic random access memory (DRAM), or may include a non-volatile memory, for example, a storage-class memory (SCM), or may include a combination of a volatile memory and a non-volatile memory. The UMC 201 may include a digital signal processor (DSP), an application specific integrated circuit (ASIC), a field programmable gate array (FPGA) or another programmable logic device, a discrete gate or transistor logic device, a discrete hardware component, an artificial intelligence chip, a system on chip, or the like. Each unit in the UMC 201 may be an independent component, or may be a unit built in one component. A form of the UCE correction module 202 and a form of the output module 203 are also not limited. The UCE correction module 202 and the output module 203 may be an FPGA or another programmable logic device.

Specifically, functions of the components in the architecture shown in FIG. 1 may be as follows.

The memory 10 is configured to store to-be-corrected data. The memory 10 may store the to-be-corrected data in a form of a data block. For example, the to-be-corrected data is data of any data block in the memory. Check information of the to-be-corrected data may be stored in the same data block, or may be stored in another location. A data structure of the to-be-corrected data is not limited in embodiments of this application. The to-be-corrected data may be stored by row and column, or may not be stored by row and column. For example, when the to-be-corrected data is stored by row and column, the to-be-corrected data may be data of N rows and M columns, where N and M are positive integers. In this case, the check information of the to-be-corrected data may include row check information and column check information for data in each of the N rows, and the column check information includes check data of each column of data in the to-be-corrected data.

The following uses an example in which to-be-corrected data is data of N rows and M columns, and check information of the to-be-corrected data and the to-be-corrected data are stored in a same data block to describe an architecture to which a data error correction method provided in this application can be applied. The CPU 20 is configured to perform error correction on the to-be-corrected data. In the UMC 201, the PS unit 2011 is configured to read the to-be-corrected data, and may send first-row data and row check information for the first-row data to the check unit 2013, and send the first-row data to the output module 203, where the first-row data is any row of data in the to-be-corrected data.

The check unit 2013 is configured to perform row check on the first-row data based on the obtained row check information of the first-row data. If it is determined that the first-row data is correct, the PS unit 2011 continues to obtain row data in the to-be-corrected data and row check information of the row of data. If it is determined that the first-row data includes a CE, the check unit 2013 corrects the CE, and sends the error-corrected first-row data to the output module 203. If it is determined that the first-row data includes a UCE, the check unit 2013 sends a UCE data transmission message to the PS unit 2011, sends an error correction notification message to the HA unit 2012, and sends a data waiting message to the output module 203.

The UCE data transmission message is used to indicate the PS unit 2011 to send the first-row data to the UCE correction module 202. The error correction notification message is used to indicate the HA unit 2012 to read column check information of the to-be-corrected data, where the column check information includes check data of each column of data in the to-be-corrected data, and each column of data includes one bit of data in the first-row data. The data waiting message is used to indicate the output module 203 to obtain the error-corrected first-row data from the UCE correction module.

The PS unit 2011 is configured to send the first-row data to the UCE correction module 202 after obtaining the UCE data transmission message.

The HA unit 2012 is configured to read the column check information, and send the column check information to the UCE correction module 202.

The UCE correction module 202 is configured to: in response to determining that the column check information includes the corrected error, check each bit of data in the first-row data based on the column check information; and if it is determined that data of a bit is incorrect, correct the data of the bit, and send error-corrected first-row data to the output module 203.

The output module 203 is configured to obtain the first-row data from the PS unit 2011, or the error-corrected first-row data from the check unit 2013, or the error-corrected first-row data from the UCE correction module 202. The output module 203 is further configured to: when no data waiting message is obtained within specified duration, output the error-corrected first-row data that is from the PS unit 2011 or the error-corrected first-row data that is from the check unit 2013; or when a data waiting message is obtained within the specified duration, output the error-corrected first-row data that is from the UCE correction module 202.

It should be noted that the functions of the foregoing modules are merely used as examples for description of the modules in the architecture shown in FIG. 1, and are not intended to limit the modules in the architecture shown in FIG. 1. For example, if it is determined that the first-row data includes a UCE, the check unit 2013 may not need to send an error correction notification message to the HA unit 2012 or send a data waiting message to the output module 203. If the HA unit 2012 obtains the first-row data from the PS unit 2011 within the specified duration, the HA unit 2012 reads the column check information, and sends the column check information to the UCE correction module 202. An interaction and collaboration manner between modules in the architecture shown in FIG. 1 may be flexibly adjusted depending on an actual application scenario. This is not limited herein.

It should be understood that the system architecture shown in FIG. 1 is merely an example. In some other examples, the system architecture may have more or fewer components than those shown in FIG. 1, two or more components may be combined, or a different component configuration may be used. For example, the HA unit and the PS unit may not be separately disposed, and the functions of the HA unit and the PS unit may be executed by one unit. The unit is a chip, and the chip executes functions of both the HA unit and the PS unit. The components shown in the figure may be implemented in hardware including one or more signal processing and/or application specific integrated circuits, software, or a combination of hardware and software.

Based on the architecture shown in FIG. 1, the following describes in detail a data error correction method provided in this application. The data error correction method provided in this application may be applied to to-be-corrected data stored in the memory 10. There may be a plurality of data structures of the to-be-corrected data.

Possible data structures of the to-be-corrected data may be as follows.

The to-be-corrected data may be stored in a plurality of rows. Quantities of bits of the rows of data in the to-be-corrected data may be the same or may be different. For a case in which the quantities of bits of the rows of data in the to-be-corrected data are the same, an example in which the to-be-corrected data is data of N rows and M columns, and each row of data may be M-bit data is used, where N and M are positive integers. In this setting manner, column check information may be set for the M columns of data. For example, one bit of check data is set for each column of data, or row check information may be set for each of the N rows of data. In addition, check information may be further set for the column check information of the to-be-corrected data, to check the column check information of the to-be-corrected data. When both the row check information and the column check information are set for the to-be-corrected data, the row check information of each row of data may be used to check the row of data. If a UCE occurs, because the column check information is further set, multidimensional check can be performed. This improves data error correction efficiency. In addition, in the manner of this example, each row of data or each column of data has corresponding check information. In this way, error correction is facilitated.

The rows of data in the to-be-corrected data may alternatively have different quantities of bits. For example, the to-be-corrected data is N rows of data, and the N rows of data include data of (M+1) bits and data of (M−1) bits. The case in which the rows of data in the to-be-corrected data have different quantities of bits is similar to the case in which the rows of data in the to-be-corrected data have a same quantity of bits. For details, refer to the case in which the rows of data in the to-be-corrected data has a same quantity of bits. Alternatively, the to-be-corrected data may not be stored in a plurality of rows. The data error correction method provided in this application may be used in all these cases. Details are not described herein again.

The check information of the to-be-corrected data also has various data structures, and these structures may be combined with the foregoing various structures of the to-be-corrected data. For example, each column of data in the to-be-corrected data and column check information of the column of data may be in a same column or may be in different columns, and each row of data in the to-be-corrected data and row check information of the row of data may be in a same row or may be in different rows.

Content of the check information of the to-be-corrected data is not limited either. For example, the row check information of each row of data in the to-be-corrected data may be an ECC, and the column check information of each column of data may be a parity check code. For another example, the row check information of each row of data in the to-be-corrected data may be a parity check code, and the column check information of each column of data may be an ECC. If the row check information or the column check information of the to-be-corrected data is the parity check code, the parity check code may be set to one bit, so that storage space for the data can be saved.

Figure 2:
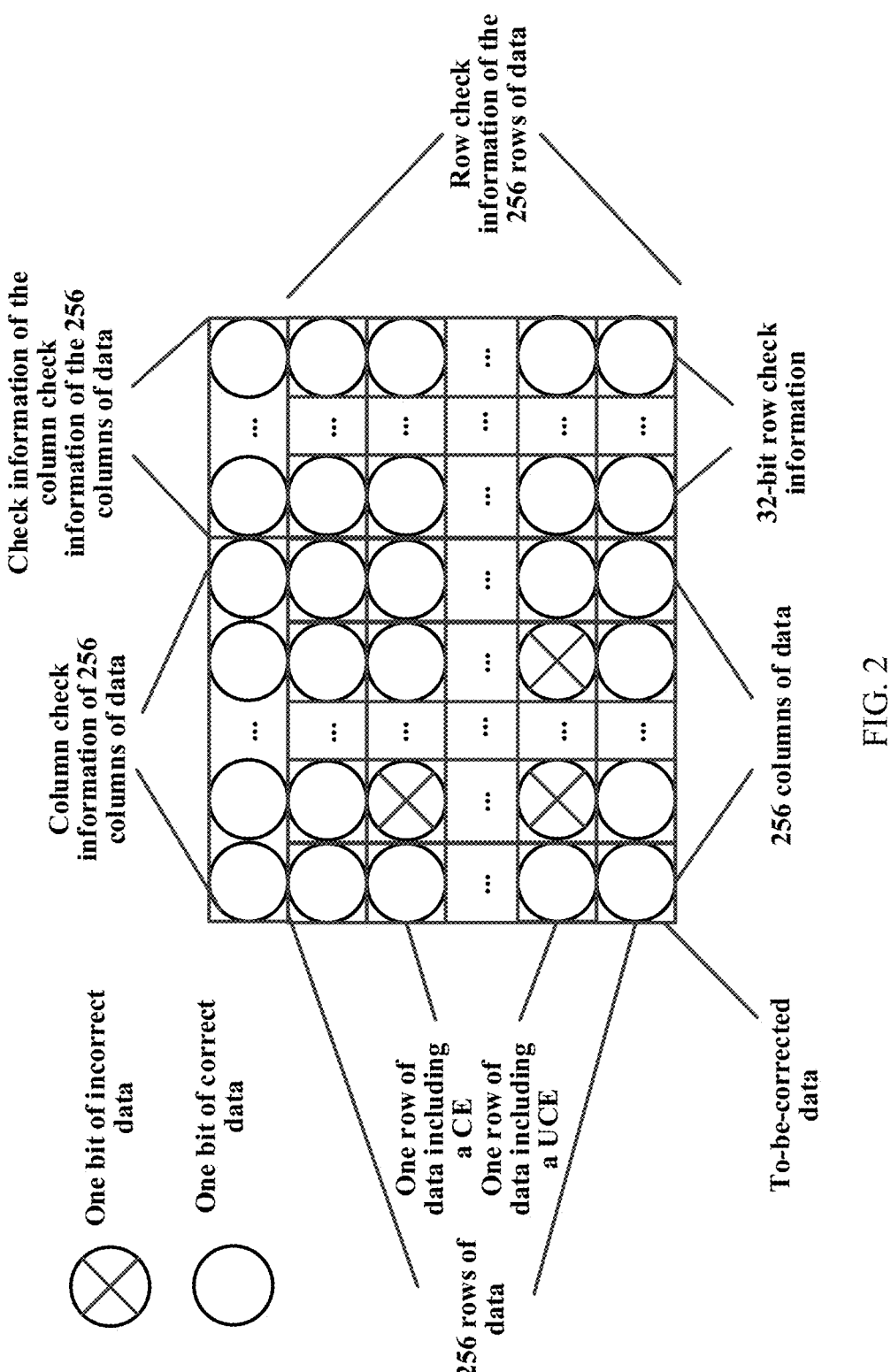
FIG. 2 is a schematic diagram of a data structure of to-be-corrected data to which a data error correction method may be applied according to an embodiment of this application.

Based on the foregoing descriptions of the to-be-corrected data and the check information, a data block shown in FIG. 2 is used as an example for description. A storage medium shown in FIG. 2 is a memory, and to-be-corrected data of a data block in the memory is data of N rows and M columns. In an example in FIG. 2, N is 256, and M is 256. An ECC of each of 256 rows of to-be-corrected data is 32 bits, and a check code of each of 256 columns of to-be-corrected data is a parity check code of the column of to-be-corrected data. The parity check code of each column of to-be-corrected data is a one-bit parity check code. A manner of storing the data block on a storage chip is not limited. For example, in the example in FIG. 2, the data block may be stored on eight storage chips, where each storage chip is a 32-bit storage chip; or the data block may be stored on four storage chips, where each storage chip is a 64-bit storage chip. It should be understood that FIG. 2 is described merely by using the example in which the to-be-corrected data is data of 256 rows and 256 columns. For other cases of data of N rows and M columns and other cases of the to-be-corrected data, refer to FIG. 2 and related descriptions.

It should be noted that the to-be-corrected data and check information of the to-be-corrected data may be updated. It is clear that the check information of the to-be-corrected data needs to be updated accordingly when the data is corrected. The data block shown in FIG. 2 is used as an example. If at least one row of data of the 256 rows of data is updated, check information of the to-be-corrected data may be updated accordingly. For example, column check information of the to-be-corrected data is updated accordingly. Data update of the to-be-corrected data and the check information may be performed by the PS unit shown in FIG. 1. The following describes in detail a process of updating data in a data block with reference to the data structure of the data block shown in FIG. 2. Before the to-be-corrected data is updated, the following process of writing to a storage medium may be implemented. After the to-be-corrected data is obtained, the column check information of the to-be-corrected data is generated based on the to-be-corrected data. The to-be-corrected data and the column check information of the to-be-corrected data are written to the storage medium. Check information of the column check information may be further generated based on the column check information, and the check information of the column check information is stored in the storage medium.

A specific case of updating the column check information of the to-be-corrected data may be as follows.

Update of the column check information of the to-be-corrected data may be synchronous update. It should be noted that synchronous update means that update of the to-be-corrected data is synchronous with update of the column check information of the to-be-corrected data, and validity of the to-be-corrected data is consistent with validity of the column check information of the to-be-corrected data. For example, when the data structure of the data block shown in FIG. 2 is used, after the to-be-corrected data (the 256 rows of data) is updated, for example, after any row of data in the to-be-corrected data is updated, the column check information of the to-be-corrected data may be updated based on the row of data that is updated, and the row of data that is updated and the updated column check information are synchronously written into the storage medium.

Figure 3:
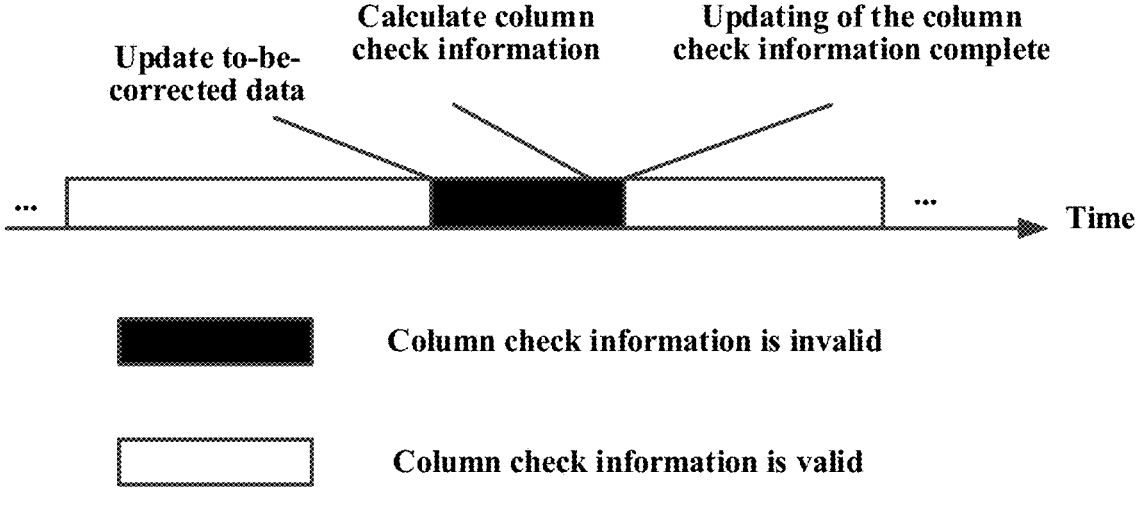
FIG. 3 is a schematic diagram of timing for synchronously updating column check information in a data error correction method according to an embodiment of this application.

During specific implementation of synchronous update of the column check information of the to-be-corrected data, a common validity flag of the to-be-corrected data and the column check information may be set. In a period in which the row of data that is updated and the column check information are not written into the storage medium, the validity flag may indicate that both the to-be-corrected data and the column check information are invalid. Timing may be that shown in FIG. 3. When the validity flag indicates that the to-be-corrected data and the column check information are valid, check may be performed based on the column check information. In a synchronous update process of the column check information, the updated data and column check information are synchronously written into the storage medium, to ensure correctness of updating the column check information.

For example, any row of data in the to-be-corrected data and column check information are synchronously updated. A specific synchronous update method may be as follows.

Preset operation is performed on a row of data that is updated and data in the row before update, to obtain an operation result. The operation result indicates, in the row of data that is updated, data of a bit that is changed after the row of data is updated. In this way, the column check information may be updated based on the operation result. For example, when the column check information is a parity check code, for each bit of updated data in a row of data that is updated, parity of a column in which the bit of the updated data is located changes. Therefore, the parity check code needs to be updated. A specific manner of the preset operation is not limited. For example, the preset operation may be exclusive OR operation. Operation efficiency of the exclusive OR operation is high, and data of a changed bit can be directly indicated. Alternatively, the preset operation may be other operation, for example, bitwise addition and bitwise complement, and an operation result can also directly indicate data of a changed bit.

According to the synchronous update manner of the column check information of the to-be-corrected data, data that needs to be updated in the column check information can be represented by using an operation result only based on the updated data rather than all of the to-be-corrected data.

Update of the column check information of the to-be-corrected data may be asynchronous update. In a possible case of asynchronous update, the to-be-corrected data in the storage medium is read based on a specified period. If it is determined that the to-be-corrected data is updated within the specified period, the column check information is updated based on the updated to-be-corrected data.

It should be noted that asynchronous update means that the to-be-corrected data and the column check information are updated asynchronously, and a case in which the to-be-corrected data is updated but the column check information is not updated may occur. For example, when the data structure of the data block shown in FIG. 2 is used, after the data block is read based on a specified period and it is determined that two rows of data in the to-be-corrected data are updated, the column check information may be updated based on the two rows of updated data.

Figure 4:
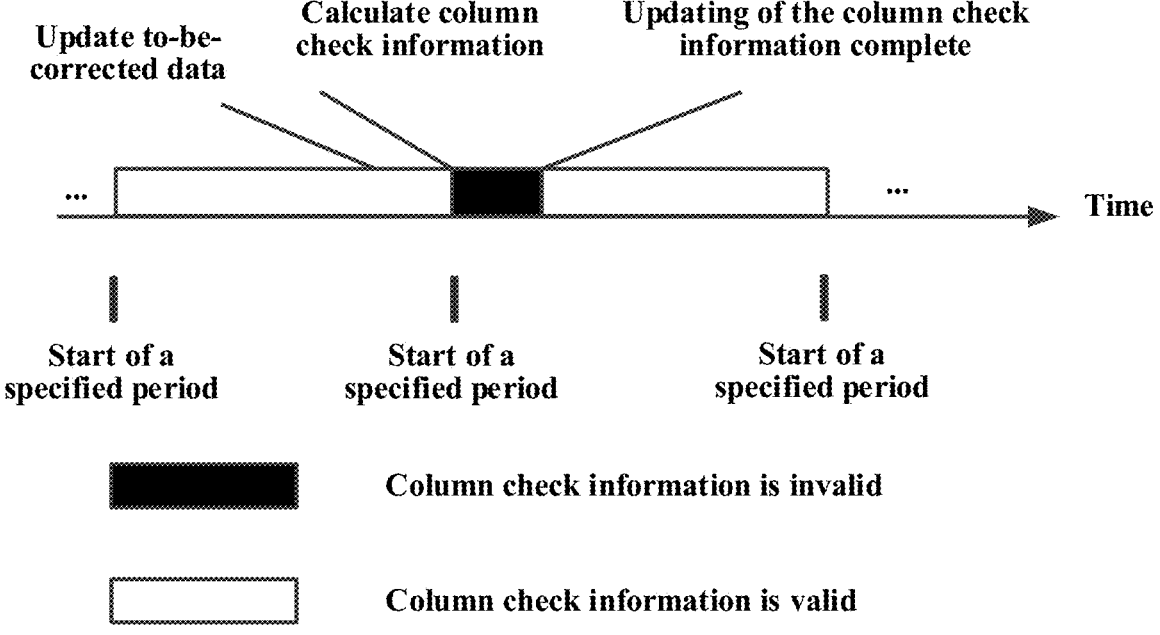
FIG. 4 is a schematic diagram of timing for asynchronously updating column check information in a data error correction method according to an embodiment of this application.

When update of the column check information of the to-be-corrected data is asynchronous update, a valid bit of the column check information may be set. When the to-be-corrected data is updated but the column check information is not updated, the valid bit may indicate that the column check information is invalid, and the to-be-corrected data is always valid by default. Timing may be that shown in FIG. 4. Check may be performed based on the column check information when the validity flag indicates that the column check information is valid. In a process of asynchronously updating the column check information, whether the to-be-corrected data is updated may be determined based on a specified period, and the column check information is further updated when it is determined that the to-be-corrected data is updated. In this way, the column check information can be updated based on the specified period while frequent access to the to-be-corrected data is not needed. The specified period may be a fixed period or a dynamically changing period.

When the specified period is a dynamically changing period, the specified period may be updated as follows.

An update frequency of the to-be-corrected data is determined; and if a frequency range which the update frequency is in is updated, the specified period is updated based on an updated frequency range. For example, frequency ranges corresponding to an update frequency of the to-be-corrected data are R1 to R5, where R1 to R5 do not overlap. The update frequency of the to-be-corrected data is definitely located in one of R1 to R5. The five frequency ranges R1 to R5 are in a one-to-one correspondence with five periods T1 to T5. It may be set that a median value of the frequency range is in a negative correlation with duration of the specified period. For example, a period corresponding to a frequency range is set to a reciprocal of a median value of the frequency range. In this manner, the specified period may be adjusted based on the update frequency of the to-be-corrected data, so that an update frequency of the column check information is adaptive to the update frequency of the to-be-corrected data. In this way, coordination of data error correction is improved.

In a possible case of asynchronous update of the column check information, the specified period may be updated as follows.

For example, the storage medium is a memory. It is assumed that the data block in which the to-be-corrected data is located is a first data block, and the memory further includes a second data block and a third data block. Before the specified period is updated, storage address information of the first data block is stored in the second data block, where the second data block corresponds to a first frequency range, the third data block corresponds to a second frequency range, and the first frequency range does not overlap with the second frequency range.

If the update frequency is within the first frequency range, the specified period is a period corresponding to the first frequency range. In this case, a process of reading the to-be-corrected data based on the specified period may be as follows.

The storage address information is read from the second data block based on the period corresponding to the first frequency range, and the first data block is read based on the storage address information that is read from the second data block.

If the update frequency is updated from the first frequency range to the second frequency range, the storage address information is read from the third data based on a period corresponding to the second frequency range, and the to-be-corrected data in the first data block is read based on the storage address information.

Figure 5:
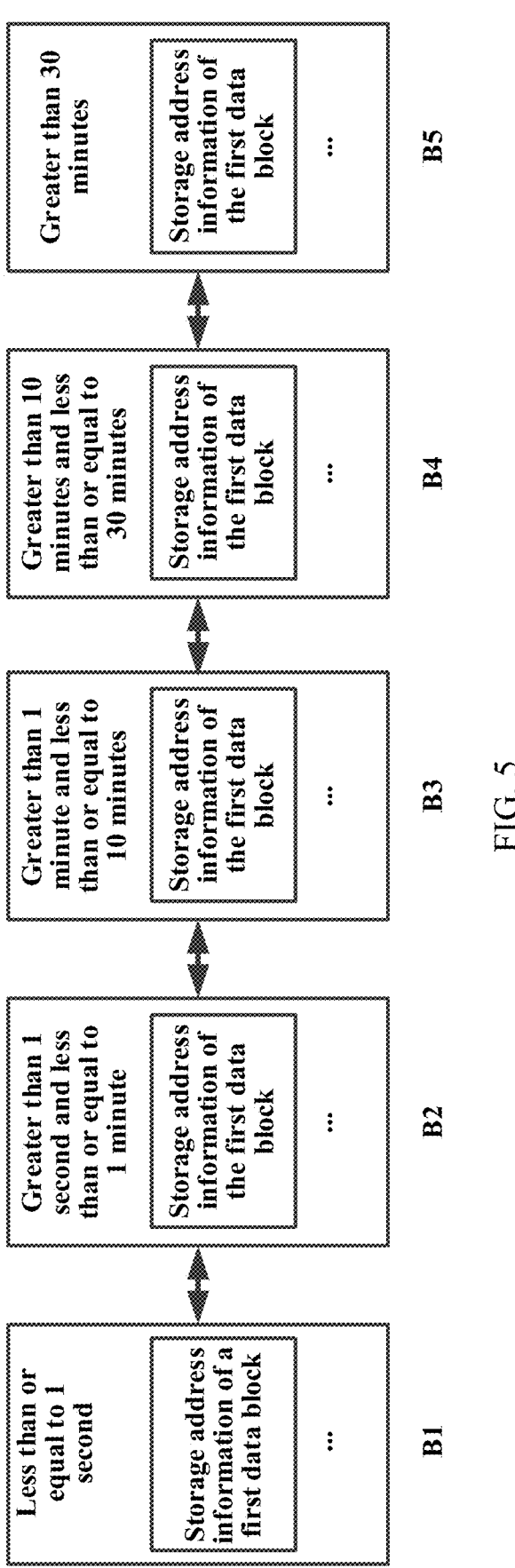
FIG. 5 is a schematic diagram of storage of storage address information of a first data block during asynchronous update of column check information in a data error correction method according to an embodiment of this application.

For example, FIG. 5 shows a storage situation of the storage address information of the first data block. There are five data blocks B1 to B5, and each of B1 to B5 may store the storage address information of the first data block. An update frequency corresponding to B1 is less than or equal to 1 second. An update frequency corresponding to B2 is greater than 1 second and less than or equal to 1 minute. An update frequency corresponding to B3 is greater than 1 minute and less than or equal to 10 minutes. An update frequency corresponding to B4 is greater than 10 minutes and less than or equal to 30 minutes. An update frequency corresponding to B5 is greater than 30 minutes. The storage address information of the first data block may be stored only in a data block corresponding to the update frequency. When the frequency range corresponding to any one of the data blocks B1 to B5 does not match the update frequency, the storage address information of the first data block in the data block may be deleted.

In the foregoing manner, for any two frequency ranges that change, for example, the first frequency range and the second frequency range, the storage address information of the first data block is read from different data blocks based on correspondences between the frequency ranges and the data blocks and correspondences between the frequency ranges and the periods. In this way, the specified period can be updated accurately.

In a possible case, asynchronous update of the column check information may be as follows.

For each row of data in the at least one row of data that is updated, preset operation is performed on the row of data that is updated and data in the row before update, to obtain an operation result. The operation result indicates, in the row of data that is updated, data of a bit that is changed after the row of data is updated. Then the column check information may be updated based on the operation result. For example, when the column check information is a parity check code, for each column of data, if a row number of a row in which data is updated is an odd number, parity of the column in which the updated data is located changes. Therefore, the parity check code needs to be updated. For example, the preset operation may be exclusive OR operation. Operation efficiency of the exclusive OR operation is high, and data of a changed bit can be directly indicated. A specific manner of the preset operation is not limited. For example, the preset operation may be exclusive OR operation. Operation efficiency of the exclusive OR operation is high, and data of a changed bit can be directly indicated. Alternatively, the preset operation may be other operation, for example, bitwise addition and bitwise complement, and an operation result can also directly indicate data of a changed bit.

In the foregoing manner, frequent access to the to-be-corrected data is not needed. Based on the specified period, by referring to only at least one row of data that is updated in the to-be-corrected data, a change of the column check information can be represented by using an operation result, and then the column check information is updated accordingly.

It should be noted that, in a case of synchronous update or asynchronous update of the column check information, when a row of data is updated, row check information for the row of data may be updated accordingly.

It should be noted that, in the data error correction method provided in this application, error correction may be performed on a UCE in to-be-corrected data when there are various data structures and update cases of the to-be-corrected data and check information. With reference to FIG. 6, the following describes in detail a data error correction method according to an embodiment of this application. The method may be performed by the architecture shown in FIG. 1. In the data error correction method shown in FIG. 6, an example in which to-be-corrected data is a plurality of rows of data is used. First-row data includes a UCE, where the first-row data does not represent a sequence of the plurality of rows of data, and the first-row data may be any row of data in the plurality of rows of data.

Step 601: Determine that the first-row data includes the UCE.

Specifically, a manner of determining whether a row of data includes a UCE may be as follows.

Row check information of the row of data is obtained through calculation based on the row of data. The calculated row check information of the row of data is compared with stored row check information. If the calculated row check information is inconsistent with the stored row check information, and error correction cannot be performed by using the row check information, it is determined that the row of data includes the UCE. If the calculated row check information is consistent with the stored row check information, it is determined that the row of data does not include the UCE. Step 601 may be performed by the PS unit 2011 shown in FIG. 1.

It should be noted that, in some cases, it may be further determined that the first-row data is the only row of data that includes an uncorrected error in the plurality rows of data. In this case, it can be ensured that even if another row of data includes an error, the error is a CE and can be corrected. In this way, reliability of data error correction is ensured.

Optionally, step 602: For any row of data in the to-be-corrected data, if the row of data includes a CE, correct the CE in the row of data based on row check information stored in the row of data. For the CE, error correction may be performed on the CE independently by using the row check information without using column check information.

Step 602 may be performed by the check unit 2013 shown in FIG. 1. Before UCE correction is performed on the first-row data, error correction may be performed on the CE in the to-be-corrected data by performing step 602. In this way, before the UCE is corrected in the first-row data, it can be ensured that even if data in another row includes a CE, the CE is corrected. Based on this, error correction can be accurately performed on the UCE in the first-row data. Step 602 is an optional step. When the data error correction method shown in FIG. 6 is performed, step 603 or 604 may be directly performed after step 601.

Optionally, step 603: If it is determined that the column check information includes a CE, in response to the foregoing determining, perform error correction on the column check information based on check information of the column check information.

Step 603 may be performed by the check unit 2013 shown in FIG. 1. Before the UCE is corrected in the first-row data, the CE may be corrected in the column check information by performing step 603. In this case, before the UCE is corrected in the first-row data, it can be ensured that even if the column check information includes a CE, the CE is corrected. Based on this, error correction may be performed on the UCE in the first-row data more accurately with more reliable column check information. Step 603 is an optional step. When the data error correction method shown in FIG. 6 is performed, step 604 may be directly performed after step 601.

Step 604: Perform error correction on each column of data in the to-be-corrected data based on the column check information.

The column check information includes check data of each column data in the to-be-corrected data, and each column of data includes one bit of data in the first-row data.

Specifically, step 604 may be as follows.

The check data in the column check information of each column of data in the to-be-corrected data is denoted as first check data of the column of data. Check data of the column data is obtained through calculation, and the check data is denoted as second check data of the column data. Whether the first check data of the column data is consistent with the second check data is determined. If the first check data is consistent with the second check data, it is determined that the column of data is correct. Otherwise, it is determined that the column of data includes an error. If the column of data includes the error, it is determined that data of a bit corresponding to the column of data in the first-row data is incorrect, and error correction is performed on the bit of data. Step 604 may be performed by the UCE correction module 202.

In the foregoing manner, the first check data can prove correctness of a column of data, and the second check data can represent an actual current situation of the column of data. Therefore, when the first check data is different from the second check data, it can be determined that the column of data is not stored in a correct manner. In this way, it is determined that the data of the bit corresponding to the column of data in the first-row data is incorrect.

Step 605: Check the corrected first-row data based on the row check information of the first-row data.

Specifically, step 605 may be as follows.

The row check information of the first-row data is denoted as first row check information. Row check information is generated based on the first-row data, where the generated row check information is denoted as second row of check information. If the first row check information is consistent with the second row check information, check succeeds. Otherwise, check fails.

Step 605 is an optional step implemented to improve reliability of error correction of the UCE in the to-be-corrected data. After step 605 is performed, if check succeeds, it is determined that error correction of the UCE in the to-be-corrected data succeeds. Step 605 may be performed by the check unit 2013 shown in FIG. 1.

According to the data error correction method shown in FIG. 6, it is determined that the first-row data of first data includes the uncorrected error. The column check information of the first data includes the check data of each column of data in the first data, and each column of data includes one bit of data in the first-row data. Error correction is performed on each column of data in the first data based on the column check information of the first data. For each bit of data in the first-row data, if the bit of data is incorrect, after error correction is performed on a column in which the bit of data is located, the bit of data is corrected. Therefore, even if the first-row data includes the uncorrected error across a plurality of storage units, error correction can be performed bit by bit on the first-row data. In this way, UCE correction is implemented.

Refer to FIG. 7. FIG. 7 is a schematic diagram of a structure of a data error correction apparatus according to an embodiment of this application. The foregoing data error correction apparatus provided in this embodiment of this application can implement all method steps implemented in the foregoing embodiment of the data error correction method, and can achieve same technical effects. A part and advantageous effects in this embodiment that are the same as those in the method embodiment are not described in detail herein again.

An embodiment of this application provides a data error correction apparatus, including:

a determining module 701, configured to determine that first-row data in to-be-corrected data includes an uncorrected error; and an error correction module 702, configured to perform error correction on each column of data in the to-be-corrected data based on column check information of the to-be-corrected data, where the column check information includes check data of each column of data in the to-be-corrected data, and each column of data includes one bit of data in the first-row data.

Optionally, the error correction module 702 is further configured to:

check error-corrected first-row data based on row check information of the first-row data.

Optionally, the to-be-corrected data includes a plurality of rows of data, and the first-row data is the only row of data that includes the uncorrected error in the plurality of rows of data.

Optionally, the column check information has corresponding check information, and the error correction module 702 is further configured to:

determine that the column check information includes a corrected error; and in response to the foregoing determining, perform error correction on the column check information based on the check information of the column check information.

Optionally, the apparatus further includes an update module 703, configured to:

update the to-be-corrected data in a storage medium; and update the column check information based on updated to-be-corrected data.

An embodiment of this application further provides an electronic device. The electronic device may have a structure shown in FIG. 8. The electronic device may be a computer device, or may be a chip or a chip system that supports a computer device in implementing the foregoing method.

Figure 8:
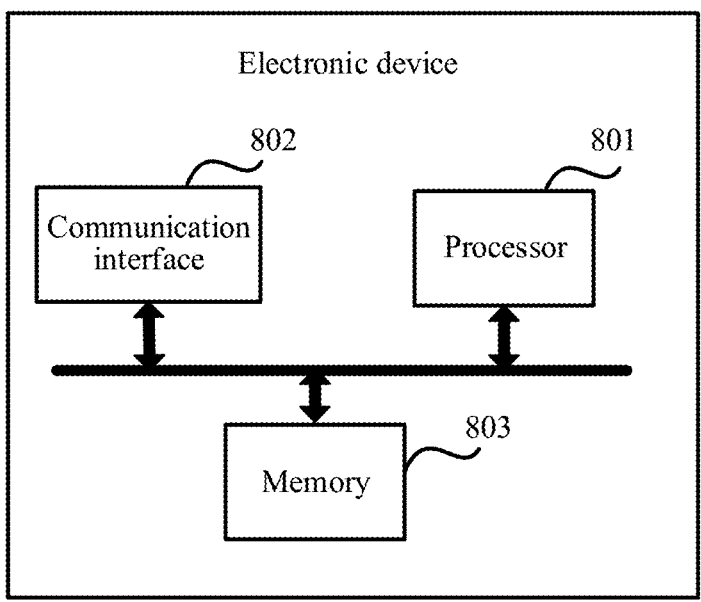
FIG. 8 is a schematic diagram of a structure of an electronic device according to an embodiment of this application.

The electronic device shown in FIG. 8 may include at least one processor 801. The at least one processor 801 is configured to couple to a memory, and read and execute instructions in the memory to implement the steps of the data error correction method provided in embodiments of this application. Optionally, the electronic device may further include a communication interface 802, configured to support the electronic device in receiving or sending signaling or data. The communication interface 802 in the electronic device may be configured to implement interaction with another electronic device. The processor 801 may be configured to implement the steps of the data error correction method performed by the electronic device.

Optionally, the electronic device may further include a memory 803. The memory 803 stores computer instructions. The memory 803 may be coupled to the processor 801 and/or the communication interface 802, and is configured to support the processor 801 in invoking the computer instructions in the memory 803 to implement the steps of the data error correction method. In addition, the memory 803 may be further configured to store data in method embodiments of this application, for example, configured to store data and instructions that are required for supporting interaction of the communication interface 802, and/or configured to store configuration information required for the electronic device to perform the method in embodiments of this application.

An embodiment of this application further provides a computer-readable storage medium. The computer-readable storage medium stores computer instructions. When the computer instructions are invoked and executed by a computer, the computer may be enabled to complete the method in any one of the foregoing method embodiment or the possible designs of the foregoing method embodiment. In this embodiment of this application, the computer-readable storage medium is not limited. For example, the computer-readable storage medium may be a (random access memory, RAM) or a (read-only memory, ROM).

This application further provides a chip. The chip may include a processor and an interface circuit, configured to complete the method in any one of the foregoing method embodiment and the possible implementations of the foregoing method embodiment. "Coupling" means direct or indirect combination of two components, and the combination may be fixed or mobile.

All or some of the foregoing embodiments may be implemented by using software, hardware, firmware, or any combination thereof. When software is used to implement the embodiments, all or some of the embodiments may be implemented in a form of computer instructions. When the computer instructions are loaded and executed on a computer, the procedures or functions according to embodiments of the present disclosure are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired manner (for example, a coaxial cable or an optical fiber) or a wireless manner (for example, infrared, microwave, or the like). The computer-readable storage medium may be any usable medium accessible by a computer, or a data storage device, for example, a server or a data center, integrating one or more usable media. The usable medium may be a magnetic medium (for example, a floppy disk, a hard disk drive, or a magnetic tape), an optical medium (for example, a DVD), a semiconductor medium (for example, a solid state disk (SSD)), or the like.

Steps of the methods or algorithms described in embodiments of this application may be directly embedded into hardware, a software unit executed by a processor, or a combination thereof. The software unit may be stored in a RAM memory, a flash memory, a ROM memory, an EPROM memory, an EEPROM memory, a register, a hard disk drive, a removable magnetic disk, a CD-ROM, or a storage medium of any other form in the art. For example, the storage medium may connect to the processor so that the processor may read information from the storage medium and write information to the storage medium. Alternatively, the storage medium may be integrated into the processor. The processor and the storage medium may be disposed in an ASIC, and the ASIC may be disposed in a terminal device. Optionally, the processor and the storage medium may alternatively be disposed in different components of the terminal device.

These computer instructions may also be loaded to a computer or another programmable data processing device, so that a series of operations are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although the present disclosure is described with reference to specific features and the embodiments thereof, it is clear that various modifications and combinations may be made to the present disclosure without departing from the scope of the present disclosure. Correspondingly, the specification and accompanying drawings are merely example descriptions of the present disclosure defined by the appended claims, and is considered as any of or all modifications, variations, combinations, or equivalents that cover the scope of the present disclosure. It is clear that a person skilled in the art can make various modifications and variations to the present disclosure without departing from the spirit and scope of the present disclosure. The present disclosure is intended to cover these modifications and variations provided that they fall within the scope defined by the claims of the present disclosure and their equivalent technologies.

What is claimed is:

1. A data error correction method, comprising:

determining that first-row data in to-be-corrected data comprises an uncorrected error, wherein column check information of the to-be-corrected data has corresponding self-check information, the column check information comprises check data of each column of data in the to-be-corrected data, and each column of data comprises one bit of data in the first-row data;

performing error correction on the column check information based on the self-check information; and performing error correction on each column of data in the to-be-corrected data based on the error-corrected column check information of the to-be-corrected data.

2. The method according to claim 1, further comprising:
checking error-corrected first-row data based on row check information of the first-row data.

3. The method according to claim 1, wherein the to-be-corrected data comprises a plurality of rows of data, and the first-row data is the only row of data that comprises the uncorrected error in the plurality of rows of data.

4. The method according to claim 1, wherein the column check information has corresponding check information, and the method further comprises:
determining that the column check information comprises a corrected error; and
in response to determining that the column check information comprises the corrected error, performing error correction on the column check information based on the corresponding check information.

5. The method according to claim 1, wherein the method further comprises:
updating the to-be-corrected data in a storage medium; and
updating the column check information based on the updated to-be-corrected data.

6. An electronic device, wherein the electronic device comprises one or more processors and one or more memories, and the one or more memories store one or more computer instructions for execution by the one or more processors to perform operations comprising:
determining that first-row data in to-be-corrected data comprises an uncorrected error, wherein column check information of the to-be-corrected data has corresponding self-check information, the column check information comprises check data of each column of data in the to-be-corrected data, and each column of data comprises one bit of data in the first-row data;
performing error correction on the column check information based on the self-check information; and
performing error correction on each column of data in the to-be-corrected data based on the error-corrected column check information of the to-be-corrected data.

7. The electronic device of claim 6, wherein the operations comprise:
checking error-corrected first-row data based on row check information of the first-row data.

8. The electronic device of claim 6, wherein the to-be-corrected data comprises a plurality of rows of data, and the first-row data is the only row of data that comprises the uncorrected error in the plurality of rows of data.

9. The electronic device of claim 6, wherein the operations comprise:
determining that the column check information comprises a corrected error; and

in response to determining that the column check information comprises the corrected error, performing error correction on the column check information based on check information of the column check information.

10. The electronic device of claim 6, wherein the operations comprise:
updating the to-be-corrected data in a storage medium; and
updating the column check information based on the updated to-be-corrected data.

11. A non-transitory computer-readable storage medium, wherein the non-transitory computer-readable storage medium comprises computer instructions which, when executed by a computer, cause the computer to perform operations comprising:
determining that first-row data in to-be-corrected data comprises an uncorrected error, wherein column check information of the to-be-corrected data has corresponding self-check information, the column check information comprises check data of each column of data in the to-be-corrected data, and each column of data comprises one bit of data in the first-row data;
performing error correction on the column check information based on the self-check information; and
performing error correction on each column of data in the to-be-corrected data based on the error-corrected column check information of the to-be-corrected data.

12. The non-transitory computer-readable storage medium of claim 11, wherein the operations comprise:
checking error-corrected first-row data based on row check information of the first-row data.

13. The non-transitory computer-readable storage medium of claim 11, wherein the to-be-corrected data comprises a plurality of rows of data, and the first-row data is the only row of data that comprises the uncorrected error in the plurality of rows of data.

14. The non-transitory computer-readable storage medium of claim 11, wherein the operations comprise:
determining that the column check information comprises a corrected error; and
in response to determining that the column check information comprises the corrected error, performing error correction on the column check information based on check information of the column check information.

15. The non-transitory computer-readable storage medium of claim 11, wherein the operations comprise:
updating the to-be-corrected data in a storage medium; and
updating the column check information based on the updated to-be-corrected data.

* * * * *